United States Patent Office 3,564,098
Patented Feb. 16, 1971

3,564,098
ANIMAL FEED COMPOSITIONS AND METHODS
Eugene S. Erwin, Phoenix, Ariz., and Gino J. Marco, Webster Groves, Mo., assignors to Monsanto Company, St. Louis, Mo., a corporation of Delaware
No Drawing. Filed June 26, 1967, Ser. No. 648,993
Int. Cl. A61k 27/00
U.S. Cl. 424—317
5 Claims

ABSTRACT OF THE DISCLOSURE

Animal feed composition containing at least one compound of the formula

R—COOH wherein R is alkyl of at least 4 and not more than 11 carbon atoms.

---

This invention relates to animal feed compositions and to methods of improving growth response in animals.

In accordance with the present invention, it has now been found that certain fatty acids are useful growth promoters for animals. Animal diets containing the fatty acids elicit a substantially greater weight gain and feed efficiency response in animals than when said diets are used alone. The growth promoting compounds are also useful for the improvement of carcass quality in cattle as manifested by increased marbling.

The improved weight gain and feed efficiency response in animals is accomplished in accordance with this invention by a method which comprises orally administering to the animal a growth-promoting amount of a fatty acid of the formula

R—COOH wherein R is alkyl of at least 4 carbon atoms and not more than 11 carbon atoms, or admixtures thereof.

The compounds of the above formula are useful in animal feeds generally, for example, poultry, swine and ruminant feeds, but they are particularly advantageous when employed in ruminant feeds for cattle and sheep.

The value of animal feeds generally has been determined directly by feeding the animal. Within the past few years, however, the invitro rumen technique whereby the changes occurring in feeds brought about by microorganisms are measured more readily and with great accuracy has been employed more frequently in the evaluation of animal feeds. This technique involves the use of an apparatus in which the digestive processes of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The results obtained by use of the aforesaid transplanted rumen technique have been confirmed in vivo by actual feeding of animals.

Several parameters have been employed in the in vitro test methods to determine the effectiveness of the active growth promoting material. In the following examples the parameter employed in evaluating the fatty acids is the change in propionic acid content in the rumen fluids. An increase in the propionic acid content of the rumen fluid indicates that a desirable response in overall ruminant performance has been brought about by the fatty acids in the feed compositions. These in vitro observations are confirmed by in vivo test methods in which rumen fluids are analyzed at the end of several days by long-term in vivo feeding of ruminants over several weeks in which weight gain and feed efficiency are measured.

In the examples of the present invention which follow, evaluation of the fatty acids is made in vitro. The in vitro rumen fluids are analyzed by a gas chromotographic procedure to determine the change of propionic acid content therein. The change in propionic acid content is expressed as percent of the propionic acid content found in the control rumen fluid.

The following examples, in which parts and percent are expressed by weight unless otherwise indicated, further illustrate the advantages of this invention.

EXAMPLE 1

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alphacellulose, and 15% soybean meal). The mixture is evaporated in a nitrogen atmosphere with constant stirring to provide a substrate coated with the test additive. This coated substrate (119 mg.) is mixed with 300 mg. of uncoated substrate and charged to 50 ml. Erlenmeyer flasks. Rumen fluid from a fasted sheep (16 to 20 hours) is taken, filtered through four layers of cheesecloth and 10 ml. of the fluid charged to each flask. A buffer solution of the following composition is prepared and adjusted to pH 6.8 with aqueous 4 N HCl.

Buffer solution in grams per liter

| | |
|---|---:|
| $NaH_2PO_4$ | .316 |
| $KH_2PO_4$ | .152 |
| $NaHCO_3$ | 2.260 |
| KCl | .375 |
| NaCl | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

Ten milliliters of the buffer solution are added to each flask. The flasks are purged with nitrogen, stoppered with pressure release valves and heated 39° C.±0.5° C. on a water shaker bath. The fermentation mixtures are incubated for 16 hours and then analyzed to determine the propionate response. Results are given below in Table I.

TABLE I

| Compound: | Propionate response, percent of control |
|---|---:|
| Control | 100 |
| An admixture of valeric (1.5%), caproic (9.7%), heptanoic (21.0%), caprylic (23.7%), pelargonic (21.7%), capric (15.5), and undecylic (6.8%) acids | 161 |
| An admixture of valeric (2%), caproic (6%), heptanoic (15%), caprylic (23%), pelargonic (23%), capric (17%), undecylic (10%) and lauric (4%) acids | 145 |

The fatty acids useful in this invention are incorporated in animal feed compositions in an effective amount over a wide range of concentrations. Significant animal responses are obtained with feed compositions containing from about 0.0001% by weight to about 0.1% by weight of fatty acids. Preferably, the feed compositions contain from about 0.0005% by weight to about 0.05% by weight of fatty acid.

Based on a fattening lamb consuming about 3 pounds of ration per day and cattle each consuming about 20 pounds of ration per day, the fatty acids are administered to sheep in an amount from about 0.0013 gm. to about 1.3 gm. per head per day, and to cattle in an amount from about 0.009 gm. to about 9.0 gm. per head per day. The fatty acids are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed.

The following fatty acids and admixtures thereof are illustrative of those useful in this invention.

| | |
|---|---|
| Valeric acid | Pelargonic acid |
| Caproic acid | Capric acid |
| Heptanoic acid | Undecylic acid |
| Caprylic acid | Lauric acid |

The oral administration of fatty acids in accordance with this invention can be accomplished in the form of tablets, capsules, powders, solutions, suspensions or in admixture with one or more components of the animal's diet. Alternatively, the fatty acids can be administered in an equivalent amount in the animal's drinking water.

Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal and the like plant products. Most ruminant feed rations also contain up to about 2 percent mineral ingredients such as bone meal, limestone, salt (NaCl) and the various trace minerals including salts of zinc, copper, manganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamins A, $B_{12}$, D and K, as well as the B vitamins such as riboflavin, niacin, pantothenic acid or salts thereof, choline, pyridoxine, thiamine, nicotinic acid or salts thereof, biotin, folic acid and the like; amino acids such as methionine, phenylalanine, arginine, glycine, histidine, isoleucine, leucine, lysine, threonine, tryptophan, valine and the like; medicaments such as antibiotics, steroids, arsenicals, anthelmintics and the like, and antioxidants, for example, 6 - ethoxy-2,2,4-trimethyl-1,2-dihydroquinoline, butylated hydroxy anisol, butylated hydroxy toluene, 4,4-bis(2,6-di-t-butyl phenol), gamma-tocopherol, esters of gallic acid, and the like.

The feed compositions of this invention can be prepared by incorporating the fatty acids in various ways into any or all components of conventional diets for the type of animal in question. The fatty acids can be added to the diet rations as the pure compounds, as a stabilized concentrate wherein the fatty acid is coated with a protective material such as gelatine or gelatin and sugar, as an adsorbate on silica gel, oatmeal, soybean meal, ion-exchange resins, as a simple admixture with a diluent such as cereal meal, and oil meal and stabilizers, or in solution or emulsion in a vegetable oil such as peanut oil, soybean oil, sesame oil and the like and preferably including a stabilizer. An oil solution or emulsion lends itself to spraying on the basal ration. Alternatively, the fatty acids can be mixed with other feed additives such as vitamins, antibiotics, minerals and other materials of this nature in a feed supplement which is supplied to grain mills or to feed manufacturers who then incorporate it into the finished diet to be supplied to the animals by the farmer. Blending of such materials can be accomplished in the usual type apparatus used for the preparation of dry feed products. For young animals the fatty acids can be incorporated into liquid or semi-liquid feeds or mashes in the form of a suspension or dispersion of the active material. An emulsion or dispersion in peanut oil, soybean oil, and the like can be prepared and these are particularly adapted for liquid compositions including drinking water. The fatty acids can be administered alone to the animals but it is more convenient and effective to use the active material in the animals' feed composition.

The embodiments of the invention in which an exclusive property or privilege is claimed are defined as follows:

1. A method of improving the growth response in ruminants which comprises orally administering a compound of the formula

R—COOH wherein R is alkyl of at least 4 and not more than 11 carbon atoms, or admixtures thereof, to a ruminant selected from the group consisting of sheep and cattle, said compound being administered to sheep in an amount from about 0.0013 gm. to about 1.3 gms. per head per day and to cattle in an amount from about 0.009 to about 9.0 gms. per head per day.

2. Method of claim 1 wherein the ruminants are cattle.

3. Method of claim 1 wherein the compound is valeric acid.

4. Method of claim 1 wherein the compound is caproic acid.

5. Method of claim 1 wherein the compound is caprylic acid.

References Cited

UNITED STATES PATENTS

| | | | |
|---|---|---|---|
| 1,455,254 | 5/1923 | Kahn | 424—318 |
| 2,846,351 | 8/1958 | Tarjan et al. | 424—318 |

FOREIGN PATENTS

| | | |
|---|---|---|
| 852,189 | 10/1960 | Great Britain. |

OTHER REFERENCES

Quraishi et al.: Journ. Econ-Entomology, vol. 58, No. 3, pp. 400–402 (1965).

STANLEY J. FRIEDMAN, Primary Examiner

U.S. Cl. X.R.

424—318; 199—27